US012732750B2

(12) United States Patent
Grell

(10) Patent No.: US 12,732,750 B2
(45) Date of Patent: Sep. 8, 2026

(54) SYSTEM AND METHOD OF CONTROLLING LOUDNESS OF AN ELECTROACOUSTIC TRANSDUCER

(71) Applicant: HEAVYS INC., New York, NY (US)

(72) Inventor: Axel Grell, Burgdorf (DE)

(73) Assignee: HEAVYS INC., New York, NY (US)

( * ) Notice: Subject to any disclaimer, the term of this patent is extended or adjusted under 35 U.S.C. 154(b) by 138 days.

(21) Appl. No.: 18/709,710

(22) PCT Filed: Nov. 13, 2022

(86) PCT No.: PCT/IB2022/060901
§ 371 (c)(1),
(2) Date: May 13, 2024

(87) PCT Pub. No.: WO2023/084470
PCT Pub. Date: May 19, 2023

(65) Prior Publication Data

US 2025/0008266 A1 Jan. 2, 2025

Related U.S. Application Data

(60) Provisional application No. 63/279,128, filed on Nov. 14, 2021.

(51) Int. Cl.
*H04R 3/04* (2006.01)

(52) U.S. Cl.
CPC ........... *H04R 3/04* (2013.01); *H04R 2430/01* (2013.01); *H04R 2430/03* (2013.01)

(58) Field of Classification Search
CPC ............. H04S 2420/07; H04S 2400/13; H04R 2430/01; H04R 2430/03; H03G 5/165; H03G 3/32
See application file for complete search history.

(56) References Cited

U.S. PATENT DOCUMENTS 5,930,373 A 7/1999 Shashoua
6,108,431 A 8/2000 Bachler
(Continued)

FOREIGN PATENT DOCUMENTS

EP 1689210 A2 8/2006
WO 2016155853 A1 10/2016
WO WO-2020188250 A1 * 9/2020 ........... H04R 1/1008

*Primary Examiner* — Brian T Pendleton
(74) *Attorney, Agent, or Firm* — The Roy Gross Law Firm, LLC; Roy D. Gross

(57) ABSTRACT

A system and method of controlling loudness of an electroacoustic transducer may include: receiving a transfer function data element representing a transfer function between (a) electrical input and (b) sound pressure level (SPL) output of the electroacoustic transducer; applying the transfer function on an incoming electrical signal, to obtain an expected SPL signal, representing expected SPL of the electroacoustic transducer in response to the incoming electrical signal; identifying at least one fundamental acoustic tone in the expected SPL signal; producing at least one electrical compensation signal, corresponding to an acoustic harmonic of the at least one identified fundamental acoustic tone; and controlling the loudness of the electroacoustic transducer, based at least in part on the at least one electrical compensation signal.

15 Claims, 9 Drawing Sheets

(56) References Cited

U.S. PATENT DOCUMENTS

| | | | | |
|---|---|---|---|---|
| 6,111,960 | A | 8/2000 | Aarts | |
| 2006/0159283 | A1 | 7/2006 | Mathew | |
| 2011/0038490 | A1 | 2/2011 | Yang | |
| 2013/0163784 | A1 | 6/2013 | Tracey | |
| 2015/0092949 | A1 | 4/2015 | Adachi | |
| 2017/0213540 | A1* | 7/2017 | Ma | G10K 11/17823 |
| 2020/0275206 | A1 | 8/2020 | Hezar | |
| 2022/0199066 | A1* | 6/2022 | Trivedi | H03G 3/32 |
| 2023/0335101 | A1* | 10/2023 | Zhang | G10K 11/17881 |

* cited by examiner

Non-limiting example of transfer function H(f) 50H amplitude.

Non-limiting example of an SPL graph (e.g., 120A, 50A) for a constant voltage (e.g., 1 Volt) input signal V(t) 20.

SYSTEM AND METHOD OF CONTROLLING LOUDNESS OF AN ELECTROACOUSTIC TRANSDUCER

CROSS-REFERENCE TO RELATED APPLICATIONS

This application is a National Phase of PCT Patent Application No. PCT/IB2022/060901 having International filing date of Nov. 13, 2022, which claims the benefit of priority under 35 U.S.C. § 119 (e) of U.S. Provisional Patent Application No. 63/279,128, titled "SYSTEM AND METHOD OF CONTROLLING LOUDNESS OF AN ELECTROACOUSTIC TRANSDUCER", filed Nov. 14, 2021, the contents of which are incorporated herein by reference in their entirety.

FIELD OF THE INVENTION

The present invention relates generally to loudness enhancement. More specifically, the present invention relates to loudness enhancer with sound dosimeter for headphones and earphones.

BACKGROUND

Listening to music via headphones or earphones can damage the hearing if performed over a long period of time and/or at a high volume level. Legal restrictions have been introduced in many countries to address this risk. Such restrictions are elaborated, for example, in the IEC 62368-1 standard and the IEC 50332 standard series. These legal regulations aim to reduce the maximum sound pressure level (SPL) to 100 decibels (dB(A)) to protect a listener's hearing.

Adhering to this standard may provide a satisfactory sensation of loudness if the acoustic dynamics (e.g., the difference in loudness between parts of a musical piece) is relatively small. For example, the music production process of pop music normally decreases the dynamic loudness range, allowing a single volume setting throughout a listening session. However, music with a large dynamic loudness range (e.g., having large difference in loudness between parts of the musical piece), such as classical music, is typically perceived by a listener as not loud enough, at least throughout quiet portions of the musical piece. In such cases, the 100 dB(A) limit may be perceived as too low, causing music enthusiasts to increase the volume on their headphones.

In addition, currently available sound dosimeters (e.g., as described in the IEC 50332-3 standard) may limit a maximum amount of cumulative sound dose for a single person using specific headphones. However, such solutions may also limit the sound level for a second user of the same headphones, who has not yet reached their maximum sound dose.

SUMMARY

Embodiments of the invention may include a method of controlling, by at least one processor, loudness of an electroacoustic transducer. The terms "electroacoustic transducer" and "transducer" may be used herein interchangeably to indicate any electrical apparatus that may produce sound based on an incoming electrical signal, including for example a headphone device, a loudspeaker, an array of loudspeakers, a phone, and the like.

Embodiments of the method may include: receiving a transfer function data element representing a transfer function between (a) electrical input to the electroacoustic transducer and (b) output sound pressure level (SPL) of the electroacoustic transducer; applying the transfer function on an input electrical signal, to obtain an expected SPL frequency graph of the electroacoustic transducer; identifying at least one fundamental acoustic tone in the SPL frequency graph; producing a compensation electrical signal, corresponding to an acoustic harmonic signal of the at least one identified fundamental acoustic tone; producing a superposition signal based on the input electrical signal and the compensation electrical signal; and providing the superposition signal as input to the electroacoustic transducer, to control loudness of the electroacoustic transducer.

According to some embodiments, identifying at least one fundamental acoustic tone in the SPL frequency graph may include: segmenting the SPL frequency graph into frequency bands; and identifying at least one fundamental acoustic tone as pertaining to a specific frequency band of the SPL frequency graph.

According to some embodiments, producing a compensation electrical signal may include determining one or more acoustic harmonic frequencies of the identified at least one fundamental acoustic tone, based on the specific frequency band of the SPL frequency graph; determining one or more acoustic harmonic amplitudes respective of the one or more acoustic harmonic frequencies, based on the specific frequency band of the SPL frequency graph; and utilizing the transfer+data element to generate a band-specific compensation electric signal. The compensation electric signal may correspond to an acoustic harmonic signal that includes the one or more acoustic harmonic frequencies in the respective one or more acoustic harmonic amplitudes.

Embodiments of the invention may include a system for controlling loudness of an electroacoustic transducer.

Embodiments of the system may include: a compensation module, a superposition module, a non-transitory memory device, wherein modules of instruction code may be stored, and at least one processor associated with the memory device. The at least one processor may be configured to execute the modules of instruction code.

Upon execution of these modules of instruction code, the processor may be configured to: receive a transfer function data element representing a transfer function between (a) electrical input to the electroacoustic transducer and (b) output sound pressure level (SPL) of the electroacoustic transducer; apply the transfer function on an input electrical signal, to obtain an expected SPL frequency graph of the electroacoustic transducer; and identify at least one fundamental acoustic tone in the SPL frequency graph. The compensation module may be configured to produce a compensation electrical signal, that corresponds to an acoustic harmonic signal of the at least one identified fundamental acoustic tone. The superposition module may be configured to: produce a superposition signal based on the input electrical signal and the compensation electrical signal; and provide the superposition signal as input to the electroacoustic transducer, to control loudness of the electroacoustic transducer.

As elaborated herein (e.g., in relation to FIGS. 2, 5), embodiments of the invention may include a method of controlling loudness of an electroacoustic transducer by at least one processor.

According to some embodiments, the at least one processor (denoted herein as processor 110) may receive a transfer function data element, representing a transfer function between (a) electrical input and (b) sound pressure level (SPL) output of the electroacoustic transducer, and may apply the transfer function on an incoming electrical signal, to obtain an expected SPL signal, representing expected SPL of the electroacoustic transducer in response to the incoming electrical signal. The at least one processor may identify at least one fundamental acoustic tone in the expected SPL signal, and control a dedicated circuitry (denoted herein as a compensation module), to produce at least one electrical compensation signal, corresponding to an acoustic harmonic of the at least one identified fundamental acoustic tone. The at least one processor may subsequently control the loudness (e.g., a perceived volume) of the electroacoustic transducer, based at least in part on the at least one electrical compensation signal.

Additionally, or alternatively, the at least one processor may control an electric circuitry (e.g., denoted herein as a superposition module), to produce an electrical superposition signal as a function (e.g., a weighted sum function) of the incoming electrical signal and the at least one electrical compensation signal. Embodiments of the invention may include providing the superposition signal as input to the electroacoustic transducer, to control loudness of the electroacoustic transducer.

According to some embodiments, the at least one processor may control a circuitry (e.g., denoted herein as an analysis module), to segment the expected SPL signal into a plurality of band-specific SPL signals, each associated with a respective frequency pass band or frequency gap band. The at least one processor may then identify, for at least one band-specific SPL signal that is associated with a frequency pass band, the at least one fundamental acoustic tone, as a prevalent tone (e.g., having a highest amplitude, and/or a minimal frequency) that is represented by the band-specific SPL signal, within the associated frequency pass band.

Additionally, or alternatively, for at least one band-specific SPL signal that is associated with a frequency pass band, the at least one processor may determine one or more acoustic harmonic frequencies of at least one identified fundamental acoustic tone, based on the respective frequency pass band; determine one or more acoustic amplitudes, corresponding to the one or more acoustic harmonic frequencies, based on the respective frequency pass band; and produce at least one respective harmonic SPL signal, representing SPL of the one or more acoustic harmonic frequencies, at the one or more corresponding acoustic amplitudes. In a complementary manner, the at least one processor may refrain from producing a respective harmonic SPL signal for at least one band-specific SPL signal that is associated with a frequency gap band.

According to some embodiments, the at least one processor may produce the electrical compensation signal by utilizing the transfer function data element to generate a band-specific, electrical compensation signal, based on at least one harmonic SPL signal. In other words, the at least one processor may produce the electrical compensation signal by obtaining an inverse transfer function data element, representing an inverse version of the electroacoustic transducer transfer function; and applying the inverse transfer function on the at least one harmonic SPL signal, to generate a respective electrical compensation signal. This electrical compensation signal may represent the one or more acoustic harmonic frequencies and the corresponding one or more acoustic amplitudes of the respective harmonic SPL signal.

According to some embodiments, each electrical compensation signal may correspond to, or be dedicated to a unique set of acoustic harmonic frequencies. Additionally, or alternatively, each electrical compensation signal may correspond to, or be dedicated to a unique group of one or more harmonic SPL signals. The at least one processor may control the superposition module so as to produce the electrical superposition signal as a weighted sum function of the at least one electrical compensation signals and the incoming electrical signal.

According to some embodiments, the at least one processor may obtain, or calculate a temporal acoustic power value, representing acoustic power that is produced by the electroacoustic transducer in response to input of the superposition signal. The at least one processor may subsequently adjust one or more weights of the weighted sum function, based on the obtained acoustic power value (e.g., so as not to surpass a predetermined acoustic power threshold).

Additionally, or alternatively, the at least one processor may integrate or accumulate the temporal acoustic power value over a predetermined timeframe, to obtain an acoustic energy value, also referred to herein as an acoustic dosage value. The at least one processor may subsequently adjust one or more weights of the weighted sum function, further based on the acoustic dosage value (e.g., so as not to surpass a predetermined acoustic dosage threshold).

Additionally, or alternatively, the at least one processor may receive one or more identification data elements, representing identification of one or more respective users of the electroacoustic transducer. For at least one identification data element, the at least one processor may attribute a respective acoustic dosage value, and may adjust the one or more weights of the weighted sum function, further based on the identification data elements (e.g., so as not to surpass a predetermined, personalized acoustic dosage threshold).

As elaborated herein (e.g., in relation to FIGS. 2, 5), embodiments of the invention may include a system for controlling loudness of an electroacoustic transducer by at least one processor. Embodiments of the system may include an analysis module circuitry, a compensation module circuitry and/or a superposition module circuitry, configured to implement the methods of controlling loudness of an electroacoustic transducer, as elaborated herein. Additionally, or alternatively, embodiments of the system may further include a non-transitory memory device, wherein modules of instruction code are stored, and a processor associated with the memory device, and configured to execute the modules of instruction code.

Upon execution of said modules of instruction code, the processor may be configured to control the analysis module circuitry, the compensation module circuitry and/or the superposition module circuitry, so as to receive a transfer function data element representing a transfer function between (a) electrical input and (b) sound pressure level (SPL) output of the electroacoustic transducer; apply the transfer function on an incoming electrical signal, to obtain an expected SPL signal, representing expected SPL of the electroacoustic transducer in response to the incoming electrical signal; identify at least one fundamental acoustic tone in the expected SPL signal; produce at least one electrical compensation signal, corresponding to an acoustic harmonic of the at least one identified fundamental acoustic tone; and control the loudness of the electroacoustic transducer, based at least in part on the at least one electrical compensation signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous, or similar elements, and in which:

Figure 1:
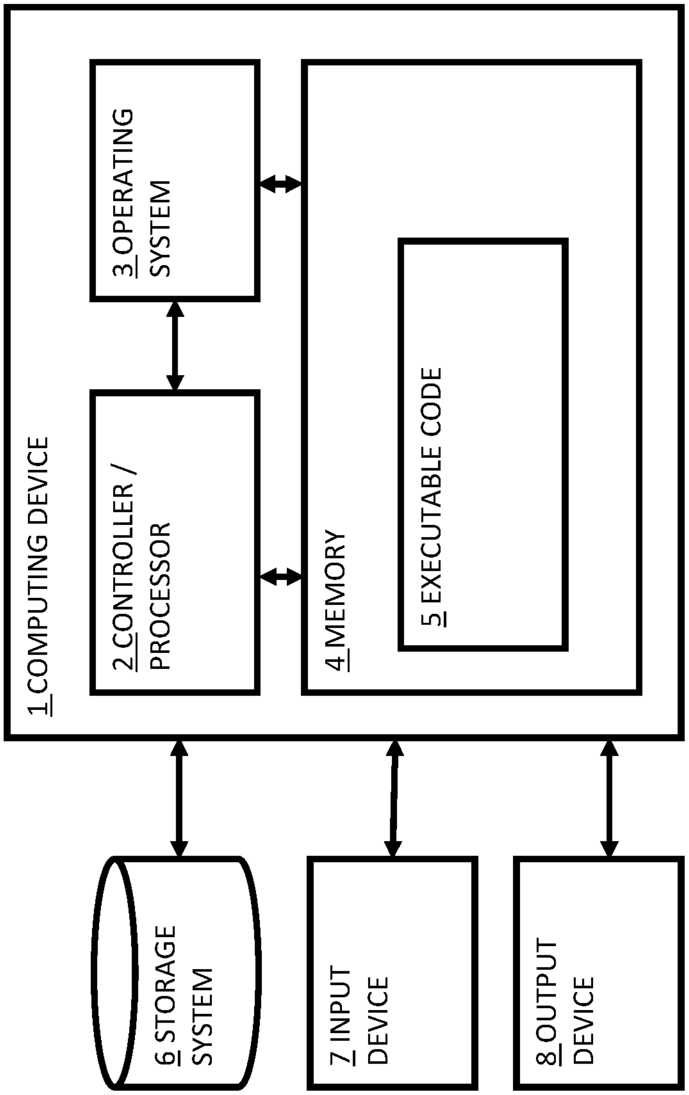
FIG. 1 is a high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, “processing,” “computing,” “calculating,” “determining,” “establishing”, “analyzing”, “checking”, or the like, may refer to operation(s) and/or process(es) of a computer, a computing platform, a computing system, or other electronic computing device, that manipulates and/or transforms data represented as physical (e.g., electronic) quantities within the computer’s registers and/or memories into other data similarly represented as physical quantities within the computer’s registers and/or memories or other information non-transitory storage medium that may store instructions to perform operations and/or processes. Although embodiments of the invention are not limited in this regard, the terms “plurality” and “a plurality” as used herein may include, for example, “multiple” or “two or more”. The terms “plurality” or “a plurality” may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term sound pressure level (SPL) may be used herein to refer to a measurable, physical value of a pressure level produced by a sound source. As known in the art, an SPL level or value is normally represented in decibel (e.g., dB(A)) units, representing an increase or decrease of the produced sound.

The term “SPL graph” may be used herein to refer to a data element representing distribution of SPL (e.g., expressed in dB(A)), in the frequency domain. In other words, an SPL graph may represent pressure level produced by a sound source, as a function of frequency components of the sound.

The term “electroacoustic transducer” may be used herein to refer to a device or apparatus such as a headphone or earphone, configured to receive an input electrical signal and produce a corresponding audio signal.

The term “loudness” may be used herein to refer to an intensity of an audio signal, as perceived by a listener or user of an electroacoustic transducer (e.g., a set of headphones) at the car reference point (ERP). It may be appreciated that the perceived loudness may correspond to objective SPL levels at the ERP, but may nevertheless also be affected by characteristics of the specific listener’s hearing, as well as by personal, psychoacoustical effects.

The term “volume” may be used herein to refer to a numerical data element or signal that may be input or introduced be a listener or user of the electroacoustic transducer (e.g., the headphones). It may be appreciated that the input volume may depend upon a plurality of factors, including for example recording levels of a played music piece. Therefore, a volume level may not directly correspond to an objective level of SPL. Instead, a volume level may be regarded herein as a user’s request to adjust (e.g., intensify or decrease) a level of desired loudness.

The human car has no absolute measure of loudness of an audio signal. Instead, a human car may relate loudness level of a sound source to loudness of existing, known sound sources. Loudness levels may also be classified by a listener based levels of distortion contained in the audio signal. Audio signals with distortion are commonly perceived as louder than signals with the same total sound pressure level, without distortion. In other words, audio signals that are distorted throughout the audible bandwidth (e.g., from 15 Hz to 20 kHz) may be perceived as louder, albeit more distorted and less clear in relation to non-distorted audio signals.

As elaborated herein, embodiments of the present invention may exploit the effect of distortion on perceived loudness to enhance (e.g., increase) loudness of an audio signal, without surpassing a predetermined SPL limit.

Additionally, or alternatively, embodiments of the invention may split the audio signal into a plurality of different frequency bands (e.g., 2, 3 or 4 different frequency bands) and apply a different distortion function on each band. As elaborated herein, such band-specific distortion functions may allow enhancement of loudness, while avoiding the perception of the audio signal as unclear or distorted.

Reference is now made to FIG. 1, which is a block diagram depicting a computing device, which may be included within an embodiment of a system for controlling loudness of an electroacoustic transducer, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may control loudness of an electroacoustic transducer as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to at least one electroacoustic transducer may be stored in storage system 6, and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse, and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
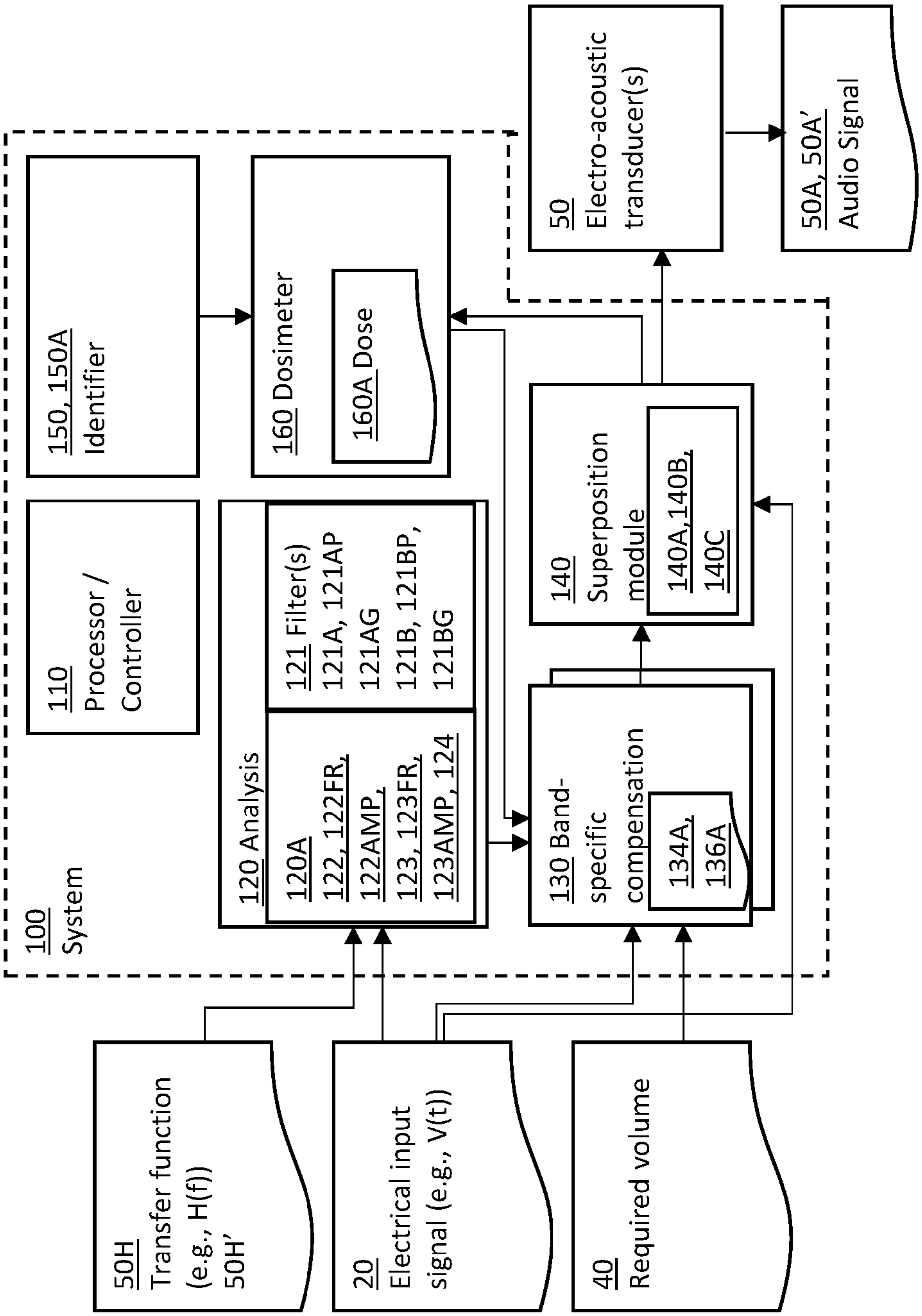
FIG. 2 is a block diagram depicting a system for controlling loudness of an electroacoustic transducer, according to embodiments of the present invention.

Reference is now made to FIG. 2, which is a block diagram depicting a system 100 for controlling loudness of at least one electroacoustic transducer 50, according to embodiments of the present invention.

According to some embodiments of the invention, system 100 may be implemented as a software module, a hardware module, or any combination thereof. For example, system 100 may be or may include a computing device such as element 1 of FIG. 1, and may be adapted to execute one or more modules of executable code (e.g., element 5 of FIG. 1) to control loudness of electroacoustic transducer 140, as further described herein.

According to some embodiments, system 100 may include the at least one electroacoustic transducer 50, and may produce an audio signal 50A by electroacoustic transducer 50, based on an electric input signal (e.g., 20, 130A) as elaborated herein.

Additionally, or alternatively, as depicted in FIG. 2, system 100 may be operationally or electrically connected to the at least one electroacoustic transducer 50. In such embodiments, system 100 may transmit at last one electrical signal 130A to the at least one electroacoustic transducer 50. The at least one electroacoustic transducer 50 may subsequently produce an audio signal 50A based on an electric signal 130A, as elaborated herein.

As shown in FIG. 2, arrows may represent flow of one or more data elements to and from system 100 and/or among modules or elements of system 100. Some arrows have been omitted in FIG. 2 for the purpose of clarity.

Figure 3A:
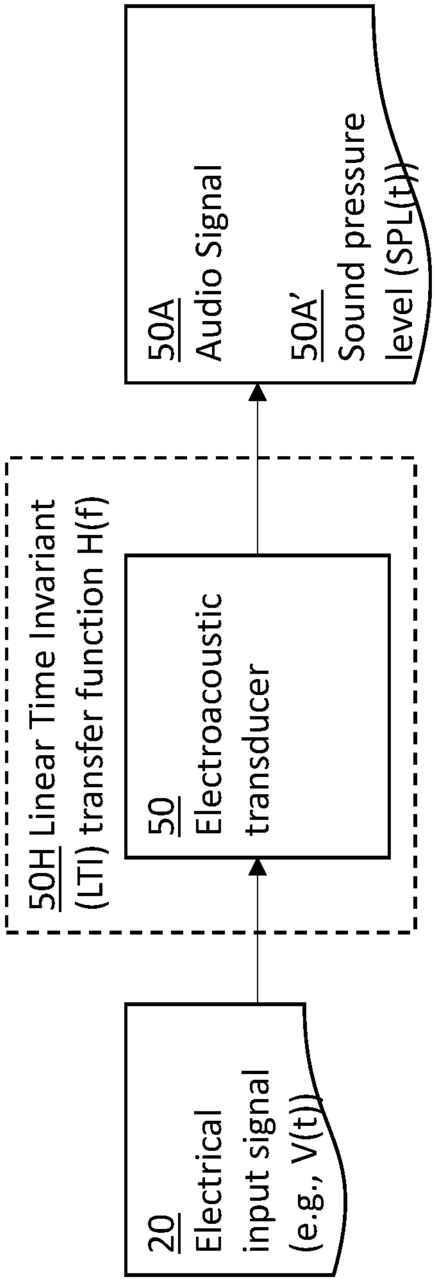
FIG. 3A is a schematic diagram depicting a transfer function between (a) electrical input to an electroacoustic transducer and (b) output SPL of the electroacoustic transducer, according to embodiments of the present invention.
Figure 3B:
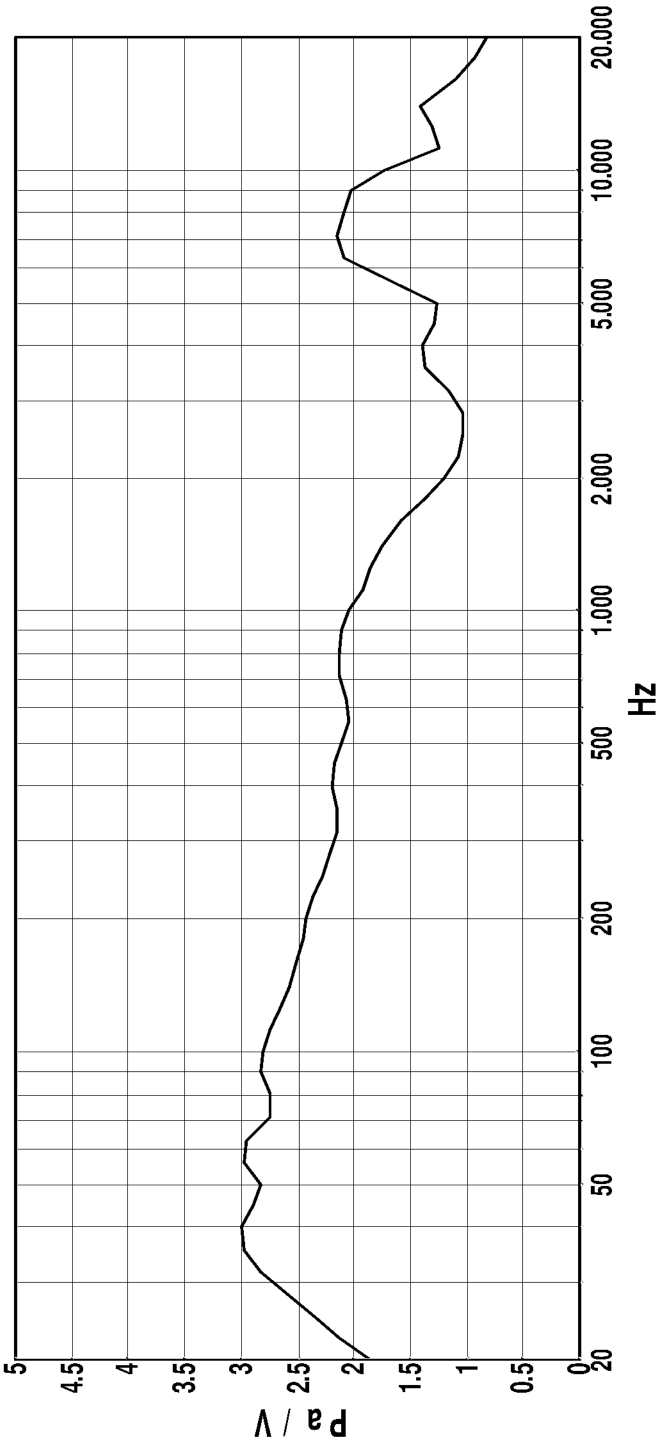
FIG. 3B is a graph showing a non-limiting example of amplitude (in dB(A)) of a transfer function H(f) of a typical electroacoustic transducer (e.g., headphones), as a function of frequency.

Reference is also made to FIG. 3A which is a schematic diagram depicting a transfer function representing a transform between (a) electrical input to an electroacoustic transducer 50 and (b) output SPL of the electroacoustic transducer 50, according to embodiments of the present invention. Reference is also made to FIG. 3B which is a graph showing a non-limiting example of amplitude (in dB(A)) of a transfer function H(f) of a typical electroacoustic transducer (e.g., headphones), as a function of frequency.

The term "transfer function" may be used herein in relation to an electroacoustic transducer to refer to transform between (a) an electrical input signal to electroacoustic transducer 50 and (b) output sound pressure level of electroacoustic transducer 50.

For example, electroacoustic transducer 50 may be regarded as a Linear Time-Invariant (LTI) system, which may receive an input electrical signal V(t), and produce an output signal SPL(t) according to equation Eq. 1A below:

$$SPL(t) = V(t) * H(t), \quad \text{Eq. 1A}$$

where:

V(t) is a time-domain representation of the electrical input signal 20,

SPL(t) is a time-domain representation of the output sound pressure level 50A', H(t) is a time-domain representation of the electroacoustic transducer's transfer function 50H, and '*' is the convolution operator.

Additionally, or alternatively the electroacoustic transducer may produce an output signal SPL(f) according to equation Eq. 1B below:

$$SPL(f) = V(f) \cdot H(f), \quad \text{Eq. 1B}$$

where:

V(f) is a frequency-domain representation of electrical input signal 20,

SPL(f) is a frequency-domain representation of the output sound pressure level 50A', H(f) is a frequency-domain representation of the electroacoustic transducer's transfer function 50H, and '·' is the point-multiplication operator.

According to some embodiments, system 100 may include an analysis module 120, configured to receive a transfer function data element 50H. Transfer function data element 50H may represent a transfer function between (a) electrical input to electroacoustic transducer 50 and (b) output sound pressure level (SPL) of electroacoustic transducer 50.

For example, transfer function data element 50H may be, or may include a vector of numerical elements. The vector of numerical elements may represent values of an SPL signal 50A' over time, that is expected to be output by electroacoustic transducer 50, in response to an impulse electrical input signal 20, according to Eq. 1A above.

According to some embodiments, analysis module 120 may also receive an electric input signal 20 (e.g., denoted in Eq. 1A as V(t)). Electric input signal 20 may correspond to or represent a respective audio signal, in a sense that electric input signal 20 may be utilized as input by an electroacoustic transducer (e.g., 50) to produce a corresponding audio signal (e.g., 50A).

It may be appreciated by a person skilled in the art, that system 100 may be implemented as an analog and/or digital circuit, associated or integrated with an electroacoustic transducer. In such implementations, the term "signal" may be used to indicate a physical signal, such as an analog and/or digital electronic signal. Additionally, or alternatively, system 100 may be implemented, at least in part, as a software module, configured to control loudness of an associated electroacoustic transducer 50. In such implementations, the term signal may be used to indicate a numerical representation, or a data element representing a physical signal, such as a digital and/or analog electronic signal. Therefore, the terms "signal", "data element" and "graph" may be used herein interchangeably, according to context.

Analysis module 120 may apply transfer function 50H on input electrical signal 20 to obtain an expected SPL signal 120A (also referred to herein as "expected SPL data element 120A", and "expected SPL frequency graph 120A"). Expected SPL signal 120A may represent SPL of the electroacoustic transducer 50 that is expected in response to the incoming electrical signal 20. In other words, analysis module 120 may produce an SPL signal 120A that represents an expected audio signal in the frequency domain.

The term "expected" may be used in this context to indicate a theoretic audio signal that could have been output by electroacoustic transducer 50 if electric input signal 20 had been used as input to electroacoustic transducer 50.

Analysis module 120 may be implemented as a combination of hardware and software modules to apply transfer function 50H on input electrical signal 20, so as to obtain expected SPL signal 120A. For example, signal 20 may be an analog electrical signal, representing an initially required acoustic signal. Analysis module 120 may sample incoming signal 20 along a predefined period of time, and use an analog-to-digital converter, to digitize the samples of signal 20, so as to produce a digital version of incoming signal 20. Analysis module 120 may then collaborate with a processing unit 110 (which may be the same as processor 2 of FIG. 1) to apply transfer function 50H on the digitized samples of incoming signal 20 (e.g., as elaborated in relation to Eq. 1A and/or Eq. 1B), thereby producing expected SPL signal 120A.

Figure 3C:
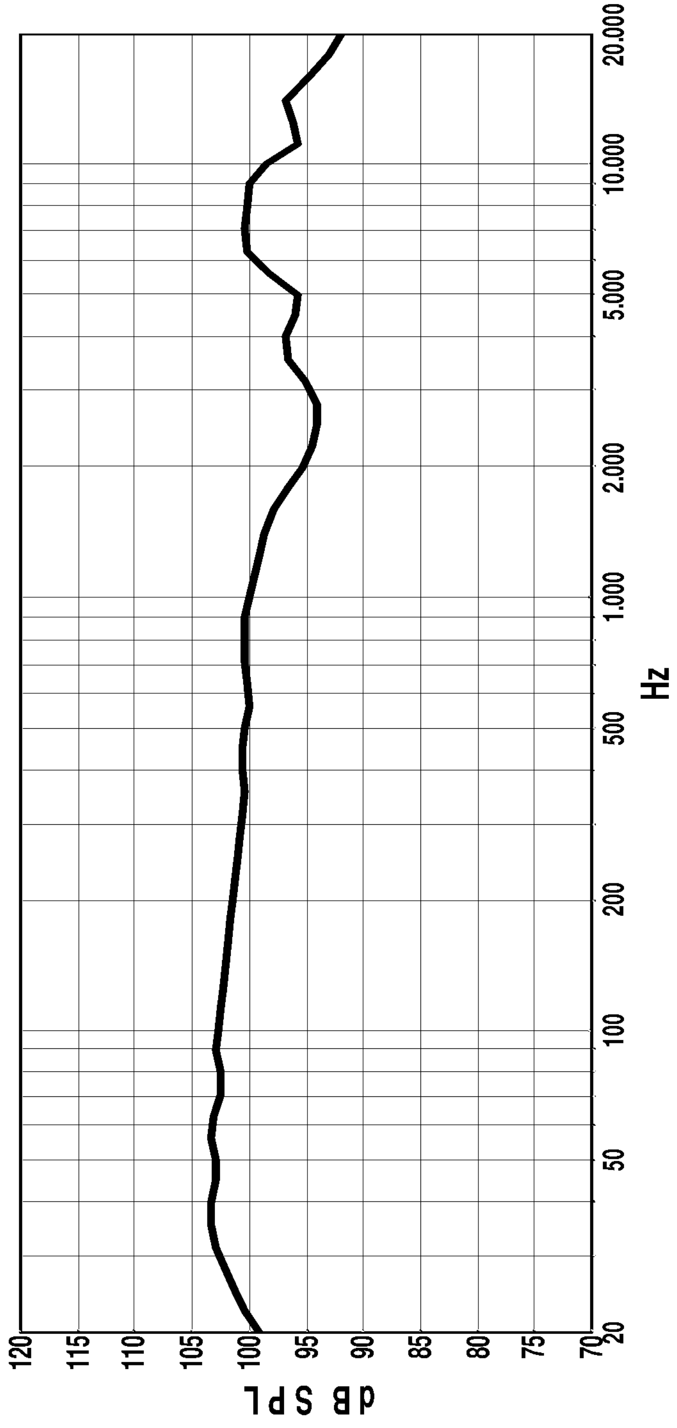
FIG. 3C is a graph showing a non-limiting example of an SPL graph of a typical electroacoustic transducer (e.g., headphones), as a function of frequency, obtained by introducing a constant input electrical signal of 1 volt.

Reference is also made to FIG. 3C which is a frequency graph showing a non-limiting example of an expected SPL signal 120A of a typical electroacoustic transducer (e.g., headphones), as a function of frequency, obtained by introducing a constant input electrical signal 20 of 1 volt. It may be appreciated, based on equation Eq. 1B, that such constant input may produce an expected SPL signal graph 120A that is similar to the H(f) amplitude graph of FIG. 3B.

According to some embodiments, analysis module 120 may include one of more frequency band filter modules 121 (or "filters 121", for short), which may be, or may include analog and/or digital band-pass and/or band-stop filters, as known in the art. Filters 121 may be configured to divide or segment expected SPL signal 120A to a plurality of frequency bands 121A. Frequency bands 121A may include one or more frequency pass bands 121AP, defining frequency bands in which system 100 may analyze expected SPL signal 120A, and one or more frequency gap bands 121AG, defining frequency bands in which system 100 may refrain from analyzing expected SPL signal 120A, as elaborated herein. It may be appreciated that the one of more filter modules 121 may thus segment or divide expected SPL signal 120A into a plurality of band-specific SPL signals 121B, each associated with a respective frequency pass band 121AP (thereby denoted pass-band SPL signal 121BP) or frequency gap band 121AG (thereby denoted gap-band SPL signal 121BG).

Additionally, or alternatively, analysis module 120 may apply the one of more filter modules 121 to input electrical signal 20, to produce a plurality of band-specific components of input electrical signal 20, and subsequently apply transfer function 50H on the plurality of band-specific components of input electrical signal 20, to obtain the plurality of band-specific SPL signals 121B (e.g., 121BG, 121BP).

Frequency pass bands 121AP may for example include: a first frequency band (e.g., between 15 Hz and 50 Hz), where fundamental acoustic tones of low bass sounds may be found; (b) a second frequency band (e.g., between 50 Hz and 100 Hz) where fundamental acoustic tones of bass sounds may be found; (c) a third frequency band (e.g., between 100 Hz and 250 Hz), where fundamental acoustic tones of low vocal sounds may be found; and (d) a fourth frequency band (e.g., between 250 Hz and 1 kHz), where fundamental acoustic tones of mid-high vocals and instrument sounds may be found.

The term "fundamental acoustic tone" may be used herein to indicate a base, or core frequency of a sound. As known in the art, a fundamental acoustic tone may include the lower-most frequency component of the relevant sound, upon which integer products of the fundamental acoustic tone are added. These integer products of the fundamental acoustic tone are commonly referred to in the art as "harmonic tones".

Fundamental acoustic tones are denoted herein as elements 122, having frequencies 122FR, and corresponding amplitudes 122AMP. Harmonic tones are denoted herein as elements 123, having harmonic frequency values 123FR and corresponding amplitudes 123AMP.

According to some embodiments, analysis module 120 may identify at least one fundamental acoustic tone 122 frequency 122FR in expected SPL signal 120A. In some embodiments, analysis module 120 may identify the at least one fundamental acoustic tone frequency 122FR in specific frequency pass bands 121AP, and refrain from identifying the at least one fundamental acoustic tone frequency 122FR in frequency gap bands 121AG. In other words, for at least one band-specific SPL signal 121BP that is associated with a frequency pass band 121AP, analysis module 120 may identify at least one fundamental acoustic tone 122 as a prevalent tone (e.g., having the lowest frequency 122FR and/or highest amplitude 122AMP) represented by the band-specific SPL signal 121BP, within the associated frequency pass band 121AP.

Pertaining to the example above, analysis module 120 may (a) identify at least one fundamental acoustic tone frequency 122FR and amplitude 122AMP of a low bass sound in the first frequency pass band 121AP; (b) identify at least one fundamental acoustic tone frequency 122FR and amplitude 122AMP of a bass sound in the second frequency pass band 121AP; (c) identify at least one fundamental acoustic tone frequency 122FR and amplitude 122AMP of a low vocal sound in the third frequency pass band 121AP; and/or (d) identify at least one fundamental acoustic tone frequency 122FR and amplitude 122AMP of a mid-high vocal or instrument sound in the fourth frequency pass band 121AP.

As shown in FIG. 2, system 100 may include one or more band-specific compensation function modules 130. According to some embodiments, band-specific compensation function modules 130 may be configured to receive input electrical signal 20, and collaborate with analysis module 120 to produce at least one electrical compensation signal 136A. Additionally, the one or more band-specific compensation function modules 130 may collaborate with a superposition module 140, to perform band-specific compensation or adjustment of input electrical signal 20, and produce an enhanced electrical signal 140A, as elaborated herein.

Figure 4A:
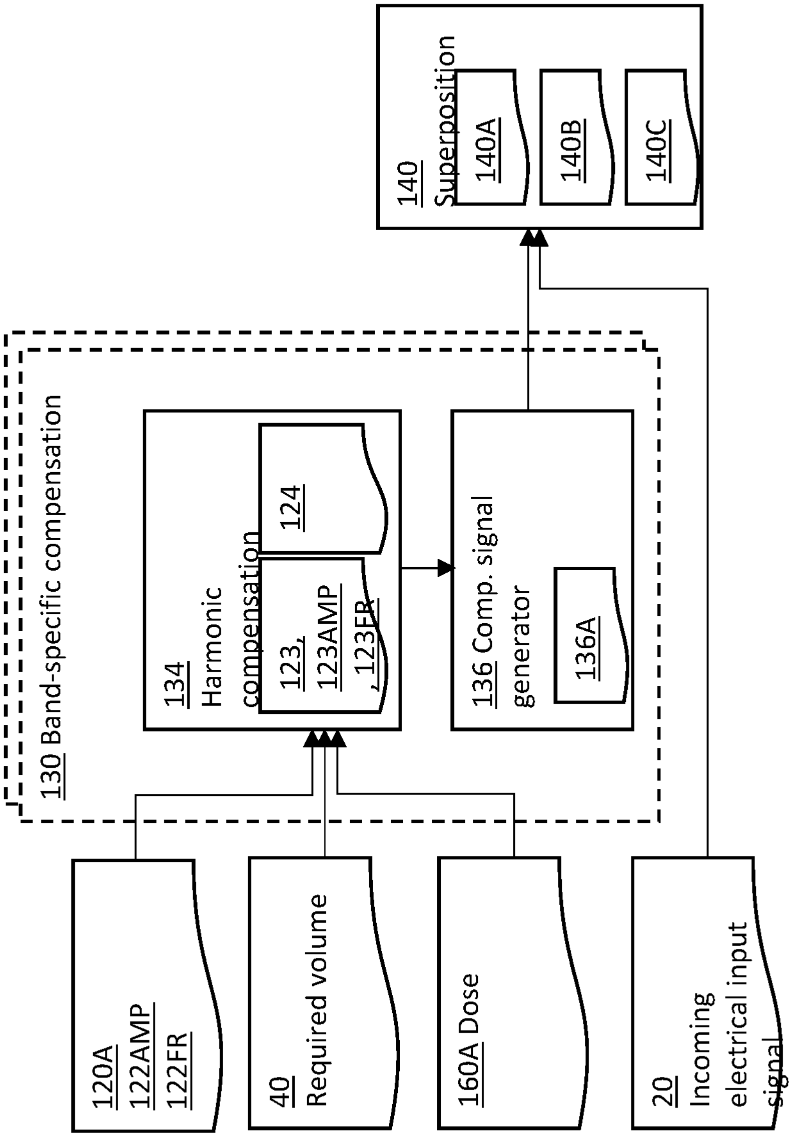
FIG. 4A is a schematic block diagram depicting an example of implementation of one or more band-specific compensation function modules and a superposition module, according to embodiments of the present invention.

Reference is also made to FIG. 4A which is a schematic block diagram depicting operation of the one or more band-specific compensation function module 130 (or "compensation module 130", for short) and superposition module 140, according to embodiments of the present invention.

According to some embodiments, analysis module 120 may identify at least one fundamental acoustic tone 122 as pertaining to a specific frequency pass band 121AP of expected SPL signal 120A, and communicate the frequency 122FR and/or amplitude 122AMP of the identified fundamental acoustic tone 122 to a relevant band-specific compensation function module 130. The term "relevant" may be understood in a sense that the communicated compensation function module 130 may be dedicated to, or assigned to handle SPL signals 121BP of the specific frequency pass band 121AP.

As elaborated herein, compensation function module 130 may subsequently perform band-specific (e.g., within pass band 121AP) compensation or adjustment of incoming electrical signal 20, based on, or corresponding to frequency 123FR and/or amplitude 123AMP of an acoustic harmonic 123 of the at least one identified fundamental acoustic tone 122.

According to some embodiments, compensation module (s) 130 may produce at least one electrical compensation signal 136A, corresponding to, or representing acoustic harmonics 123 of at least one identified fundamental acoustic tones 122. Compensation module(s) 130 may then collaborate with superposition module 140 to produce an electrical superposition signal 140, also referred to herein as enhanced electrical signal 140A, as a function of the incoming electrical signal 20 and the at least one electrical compensation signal 136A. For example, superposition module 140 may apply a weighted sum function on the incoming electrical signal 20 and the at least one electrical compensation signal 136A, to add or accumulate band-specific electrical compensation signal 136A with incoming electrical signal 20, thereby producing electrical superposition signal 140A.

Electrical superposition signal 140A may be referred to as an enhanced electrical signal 140A, in a sense that it may serve as input for electroacoustic transducer 50, to produce a subsequent enhanced audio signal 50A. The term "enhanced" may be used in this context to indicate that audio signal 50A may be perceived by a listener or a user of electroacoustic transducer 50 as having an increased level of loudness at the ear reference point (ERP), and yet not be perceived by the user as distorted or unclear.

As elaborated herein, superposition module 140 may modify a weight of electrical compensation signal 136A in enhanced electrical signal 140A, according to predefined requirements and/or scenarios. In other words, superposition module 140 may provide the superposition signal as input to the electroacoustic transducer to control loudness of the electroacoustic transducer 50, based at least in part on the at least one, band-specific electrical compensation signal 136A.

Compensation modules 130 may be “band-specific” in a sense that identified fundamental acoustic tone 122 frequencies 122FR of each frequency band 121A may be handled separately, or differently for each band, to avoid having audio signal 50A perceived as distorted, as elaborated herein.

According to some embodiments, compensation module 130 may include a harmonic compensation module 134, configured to receive (e.g., from analysis module 120) a value of a fundamental acoustic tone frequency 122FR and a respective fundamental acoustic tone amplitude 122AMP.

Figure 4B:
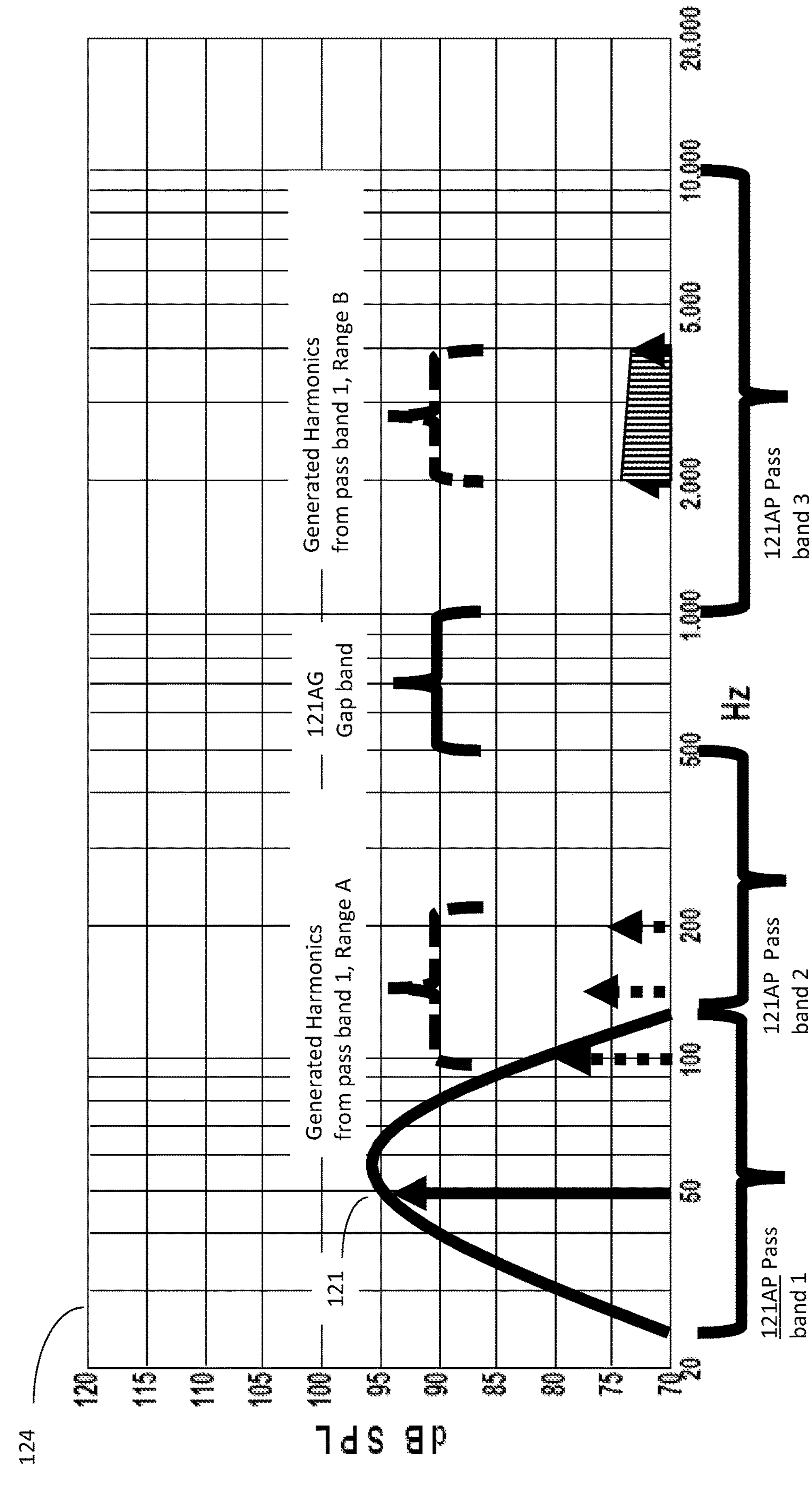
FIG. 4B is a graph depicting a band-specific compensation function, provided by a band-specific compensation module, according to embodiments of the present invention.

Reference is also made to FIG. 4B, which is a schematic graph depicting a band-specific compensation function, provided by a band-specific compensation module 130, according to embodiments of the present invention.

As shown in the example of FIG. 4B, expected SPL signal 120A may be divided by a plurality of filters 121 to a plurality of pass bands 121AP and/or gap bands 121AG (thus forming band-specific SPL signals 121B). A fundamental acoustic tone 122 in band pass 1 is denoted as a schematic delta function having a frequency 122FR of 50 Hz.

Harmonic compensation module 134 may subsequently determine or add one or more harmonic tones 123, having respective harmonic tone frequency values 123FR and corresponding harmonic tone amplitude values 123AMP, based on the received fundamental acoustic tone values 122FR, 122AMP.

The one or more harmonic values 123FR, 123AMP may include, for example one or more harmonic frequency values 123FR corresponding to harmonics of fundamental acoustic tone frequency 122FR. In other words, the one or more harmonic frequency values 123FR may be integer product values of fundamental acoustic tone frequency 122FR.

According to some embodiments, for at least one band-specific SPL signal 121BP that is associated with a frequency pass band 121AP, harmonic compensation module 134 may determine one or more acoustic harmonic tone 123 frequencies 123FR of at least one identified fundamental acoustic tone 122, based on the respective frequency pass band. For example, harmonic compensation module 134 may be configured to determine a first number of harmonic tones for a first fundamental tone 122, in a first frequency pass band 121AP, and determine a second, different number of harmonic tones for a second fundamental tone 122, in a second frequency pass band 121AP.

Additionally, or alternatively, harmonic compensation module 134 may determine one or more acoustic amplitudes 123AMP, corresponding to the one or more acoustic harmonic frequencies 123FR, based on the respective frequency pass band 121AP. For example, harmonic compensation module 134 may be configured to determine a first amplitude 123AMP for a first harmonic tone in a first frequency pass band 121AP, and determine a second, different amplitude 123AMP for a second harmonic tone in a second frequency pass band 121AP.

Additionally, or alternatively, harmonic compensation module 134 may be configured to determine a first amplitude 123AMP for a first harmonic tone originating from a fundamental tone 122 in a first frequency pass band 121AP, and determine a second, different amplitude 123AMP for a second harmonic tone, originating from a fundamental tone 122 in a second frequency pass band 121AP.

For example, as shown in FIG. 4B, Harmonic compensation module 134 may create harmonic tones 123 of 2nd to 4th order (denoted range A) in pass bands (121AP) 1 and 2, and harmonics of 40th to 80th order (denoted range B) in pass band (121AP) 3.

Harmonic compensation module 134 may thus produce at least one harmonic SPL signal 124, representing SPL of the one or more acoustic harmonic tone 123 frequencies 123FR, at the one or more corresponding acoustic amplitudes 123AMP.

Additionally, or alternatively, harmonic compensation module 134 may refrain from producing harmonic tones 123 in gap bands 121AG, or originate from fundamental tones 122 in gap bands 121AG. In other words, for at least one band-specific SPL signal that is associated with a frequency gap band 121AG, harmonic compensation module 134 may refrain from producing a respective harmonic SPL signal.

As explained herein, the one or more harmonic amplitude values 123AMP may represent amplitudes of respective one or more harmonic frequency values 123FR of fundamental acoustic tones 122. Due to the fact that transfer function 50H and SPL 120 at the ERP are known, harmonic compensation module 134 may determine the one or more harmonic values (e.g., harmonic frequencies 123FR and respective harmonic amplitudes 123AMP) such that the loudness of audio signal 50A may be enhanced, without negative effects on the sound impression, e.g., without being perceived by a listener as distorted, based on predefined rules or configurations.

For example, harmonic compensation module 134 may be configured to avoid adding harmonic components 123 at frequencies 123FR relative to the fundamental frequency 122FR where expected SPL graph 120A shows peaks.

Additionally, or alternatively, harmonic compensation module 134 may be configured to add harmonic components 123 having harmonic frequencies 123FR where expected SPL graph 120A shows troughs.

Additionally, or alternatively, harmonic compensation module 134 may be configured to add harmonic frequency 123FR components, at specific harmonic amplitudes 123AMP, where the harmonic amplitudes 123AMP are selected based on the amplitude of the expected SPL graph 120 at the harmonic frequency 123FR.

Additionally, or alternatively, harmonic compensation module 134 may: (a) add a harmonic frequency 123FR component with a high amplitude 123AMP in a frequency where expected SPL graph 120 presents or includes low amplitude (e.g., below a predefined threshold); and (b) add a harmonic frequency 123FR component with a low amplitude 123AMP in a frequency where the expected SPL graph 120 presents or includes high (e.g., above a predefined threshold) amplitude.

Additionally, or alternatively, harmonic compensation module 134 may determine one or more acoustic harmonic frequencies 123FR of the identified at least one fundamental acoustic tone 122, based on the specific frequency bands 121A of the expected SPL frequency graph 120A.

Additionally, or alternatively, harmonic compensation module 134 may determine one or more acoustic harmonic amplitudes 123AMP respective of the one or more acoustic harmonic frequencies 123FR, based on the specific frequency band 121A of the expected SPL frequency graph 120A.

It may be appreciated that such band-specific determination of acoustic harmonic frequencies 123FR and respective amplitudes may avoid producing a sensation of distortion when listening to the enhanced audio signal 50A.

For example (a) for a first frequency band 121A (e.g., 121AP between 15 Hz and 50 Hz) harmonic compensation module 134 may determine a first number or set of acoustic harmonic frequencies 123FR, having respective first amplitudes 123AMP; (b) for a second frequency band 121A (e.g., 121AP between 250 Hz and 1 KHz) harmonic compensation module 134 may determine a second number or set of acoustic harmonic frequencies 123FR, having respective second amplitudes 123AMP; etc.

According to some embodiments, compensation module 130 may include a compensation signal generator 136, adapted to receive one or more harmonic frequencies 123FR and respective one or more harmonic amplitudes 123AMP from harmonic compensation module 134.

Compensation signal generator 136 may include circuitry configured to utilize transfer function data element 50H so as to generate a band-specific, electrical compensation signal 136A. Electrical compensation signal 136A may correspond to, or be based on at least one acoustic harmonic SPL signal 124 that includes the one or more acoustic harmonic frequencies 123FR in the respective one or more acoustic harmonic amplitudes 123AMP.

In other words, compensation signal generator 136 may use the information of transfer function H(f) of Eq. 1B (represented by transfer function data element 50H), to produce a compensation electric signal 136A that corresponds to one or more acoustic harmonic frequency 123FR components, having respective one or more acoustic amplitudes 123AMP.

Compensation electric signal 136A may be referred to herein as "corresponding" to an acoustic harmonic SPL signal 124 of the at least one identified fundamental acoustic tone 122 in a sense that if compensation electric signal 136A is used as input to electroacoustic transducer 50, then electroacoustic transducer 50 would produce an audio signal 50A (based on transfer function H(f) 50H), which would include the determined harmonic frequencies 123FR at the respective determined harmonic amplitudes 123AMP.

Compensation electric signal 136A may be referred to herein as "band specific" in a sense that compensation signal generator 136 may produce compensation electric signal 136A differently, depending on the pertinence of identified fundamental acoustic tone 122 to specific frequency bands 121A.

According to some embodiments, compensation signal generator 136 may be implemented as a combination of hardware and software modules to apply an inverse of transfer function 50H on at least one harmonic SPL signal 124, to generate a respective, band specific electrical compensation signal 136A.

For example, harmonic SPL signal 124 may be a digital signal, or digital representation of required acoustic harmonic tones 123. Compensation signal generator 136 may collaborate with a processor 110 (such as processor 2 of FIG. 1) to obtain (e.g., receive via input 7 of FIG. 1 or calculate) an inverse transfer function data element 50', representing an inverse version of the electroacoustic transducer transfer function 50. Compensation signal generator 136 may then apply the inverse transfer function on the at least one harmonic SPL signal 124 (e.g., in a similar manner to Eq. 1B) to generate a respective, band specific, digital representation of a required electrical compensation signal 136A. Compensation signal generator 136 may subsequently apply a digital-to-analog converter, to produce an analog, band specific, electrical compensation signal 136A. Compensation signal 136A may represent (i) the one or more acoustic harmonic frequencies and (ii) the corresponding one or more acoustic amplitudes of the respective, band-specific harmonic SPL signal 124.

Figure 4C:
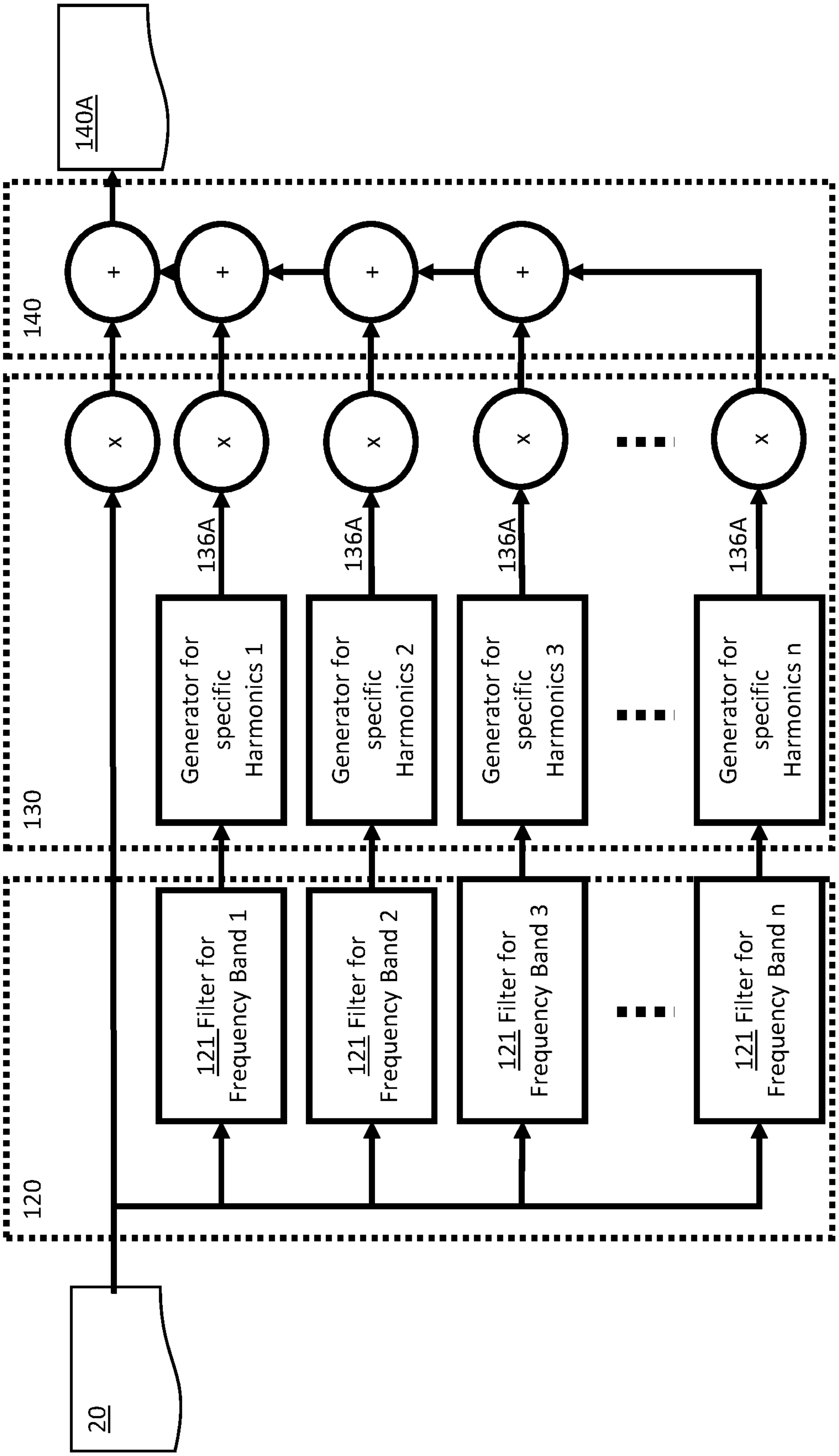
FIG. 4C is a schematic diagram depicting an aspect of functionality of system 100 for controlling loudness of an electroacoustic transducer, according to embodiments of the present invention.

Reference is also made to FIG. 4C, which is a schematic diagram depicting an aspect of functionality of system 100 for controlling loudness of an electroacoustic transducer, according to embodiments of the present invention.

As shown in FIG. 4C, module 120 may apply filters 121, to divide the treatment of incoming signal 20 to a plurality of band-specific channels. Band-specific compensation function modules 130 may each produce a band-specific compensation electrical signal 136A, thus forming a plurality of band-specific compensation electrical signals 136A. Superposition module 140 may add, sum, or accumulate the plurality of band-specific compensation electrical signals 136A with incoming signal 20 (e.g., by a weighted sum function) to produce a single, united enhanced electrical signal 140A.

Additionally, or alternatively, each electrical compensation signal 136A may correspond to a unique set of acoustic harmonic tone 123 frequencies 123FR, and electrical superposition signal 140A may be produced as a weighted sum function of the electrical compensation signals 136A and the incoming electrical signal 20. Additionally, or alternatively, each electrical compensation signal 136A may correspond to a unique group of one or more harmonic SPL signals 124, and the electrical superposition signal 140A may be produced as a weighted sum function of the at least one electrical compensation signals 136A and the incoming electrical signal 20.

For example, a compensation signal generator 136 of a first band-specific compensation function module 130 may produce a first band-specific compensation electrical signal 136A for a first fundamental acoustic tone 122, that is identified as pertaining to, or included in a first frequency pass band 121AP; a compensation signal generator 136 of a second band-specific compensation function module 130 may produce a second band-specific compensation electrical signal 136A for a second fundamental acoustic tone 122, that is identified as pertaining to, or included in a second frequency pass band 121AP; etc.

According to some embodiments, superposition module 140 may be configured to superimpose or perform a weighted sum of the plurality of band-specific compensation electrical signals 136A, and incoming electrical signal 20 to produce superposition signal 140A so as to adhere to legal restrictions and limitations. Since the frequencies and amplitudes of the added harmonic frequency components 123FR, and the transfer function H(f) are known, superposition module 140 may ensure that the legal limits for the maximum SPL are never exceeded.

According to some embodiments, system 100 may obtain a temporal acoustic power value 140C, representing acoustic power that is produced by the electroacoustic transducer 50 in response to input of superposition signal 140A, and may adjust one or more weights of harmonic components 123 and/or incoming signal 20 in the weighted sum function, based on the obtained acoustic power value 140C.

For example, processor 110 may apply transfer function 50H (e.g., H(f) of Eq. 1B) to calculate an expected SPL graph 140B of superposition signal 140A. Superposition module 140 may subsequently calculate power 140C of superposition signal 140A, e.g., as a signal-square integral of SPL graph 140B over the audible bandwidth. If power contribution of harmonic components 123 in all SPL 120A bands 121A causes power 140C of superposition signal 140A to exceed a predefined limit, then superposition module 140 may, for example decrease the weight of incoming signal 20 in the generation of superposition signal 140A. For example, if (a) the value of power 140C of superposition signal 140A is at the predefined limit, and (b) a contribution of harmonic frequency components 123 in all SPL 120A bands adds up to a total proportion of 10% of the original signal 20, then superposition module 140 may reduce the portion of original incoming signal 20 by 0.83 dB (decibels) in the generation of superposition signal 140A.

According to some embodiments, system 100 may transmit or provide superposition signal 140A as input to electroacoustic transducer 50. As elaborated herein, the addition or superposition of electrical compensation signals 136A to the original input electric signal 20 may control loudness of the electroacoustic transducer, in a manner that (a) adheres to safety regulations; (b) takes individual sound dose accumulation into account; (c) provides satisfactory loudness for individual listeners; and (d) avoids noticeable sensation of sound distortion.

According to some embodiments, compensation module 130 may be employed in a plurality of work modes, to provide a required acoustic enhancement effect. Each such work mode may relate to a specific condition or scenario, as elaborated herein.

For example, a first work mode may be referred to herein as a "constant enhancement" work mode. In the constant enhancement work mode, compensation module 130 may add harmonic components (e.g., components having harmonic frequencies 123FR and respective harmonic amplitudes 123AMP) regardless of a required volume setting 40. In other words, in the constant enhancement work mode, compensation module 130 may add a predefined amount (e.g., 10% of overall power 140C) of harmonic components in all SPL frequency bands 121A.

Another work mode may be referred to herein as an "increasing volume enhancement" work mode. In the increasing volume enhancement work mode, compensation module 130 may add harmonic components 123 and/or increase a portion (e.g., amplitude) of harmonic components 123 in overall power 140C as the required overall volume 40 is increased. For example, the amount of power contributed by added harmonic components 123 (e.g., the number of harmonic components 123 and/or their amplitudes 123AMP) in one or more (e.g., all) frequency bands 121BP may start with 0% of power 140C and may increase proportionally to increase of volume demand 40 up to a maximum value (e.g., 10%) at a maximum volume setting.

Another work mode may be referred to herein as a "maximal volume enhancement" work mode. In the maximal volume enhancement work mode, compensation module 130 may add harmonic components 123 and/or increase a portion (e.g., amplitude 123AMP) of harmonic components in overall power 140C when required volume 40 has reached a predefined threshold or limit value (e.g., a maximal value, a value that is 10%, 20%, 30% or the like below the maximum value, or any other predefined limit). For example, if a maximum required volume setting 40 of the headphone is reached, then compensation module 130 may increase only the portion of added harmonic components 123 in power 140C, e.g., from 0% up to 10%.

Another work mode may be referred to herein as a "dosimeter enhancement" mode. According to some embodiments, system 100 may include a personalized dosimeter module 160, configured to receive temporal acoustic power 140C, and sum, or integrate the total amount of power 140C over a predetermined time frame (e.g., a moving time frame) to obtain an acoustic dosage value 160A. In other words, personalized dosimeter 160 may produce a dose data element 160A which represents integration of power 140C over the past predefined time frame. Superposition module 140 may then adjust the one or more weights of harmonic components 123 and/or incoming signal 20 in the weighted sum function based on the acoustic dosage value (e.g., to avoid surpassing a predefined dosage limit).

According to some embodiments, dosimeter 160 may be personalized for the use of specific listeners or users. For example, a predefined time frame may be an hour, a day and/or a week, and dose data element 160A may represent the integration of acoustic power (e.g., the acoustic energy) absorbed by a specific listener over the past hour, day and/or week, respectively. Dosimeter module 160 may be referred to herein as "personalized" in a sense it may associate a specific dose 160A with a specific user, or listener, and may thus facilitate personalized enhancement and/or limitation of acoustic signal 50A.

For example, dosimeter module 160 may include, or may be communicatively connected to an identifier module 150. Identifier module 150 may be configured to receive (e.g., via input device 7 of FIG. 1) one or more identification data elements 150A (e.g., a name, a serial number, etc.) representing identification of one or more respective users of the electroacoustic transducer e.g., whenever electroacoustic transducer 50 (e.g., a headphone set) is used. The term "used" may refer in this context to a condition that electroacoustic transducer or headphone is placed at a person's ear, and/or audio signal 50A is produced. Dosimeter module 160 may thus accumulate power 140C over a moving time frame to produce personalized dose 160A, and associate personalized dose 160A with the identified user.

In the dosimeter enhancement work mode, compensation module 130 and/or superposition module 140 may adjust the one or more weights of the weighted sum function, further based on the identification data elements 150A. For example, compensation module 130 may add harmonic components and/or increase a portion (e.g., amplitude) of harmonic components in overall power 140C according to personalized dose 160A.

For example, personalized dose 160A may indicate that a specific listener has reached the maximum daily or weekly dose. Alternatively, personalized dose 160A may indicate that a specific listener has reached a specific portion of the daily or weekly dose (e.g., 75% percent of the daily or weekly dose, 90% of the daily or weekly dose, and the like). In such embodiments, compensation module 130 and/or superposition module 140 may (a) increase the proportion of harmonic components in superposition signal 140A, and (b) reduce the overall amplitude of superposition signal 140. Such a setting may decrease power 140C, and yet provide satisfactory loudness sensation to the specific user or listener.

Figure 5:
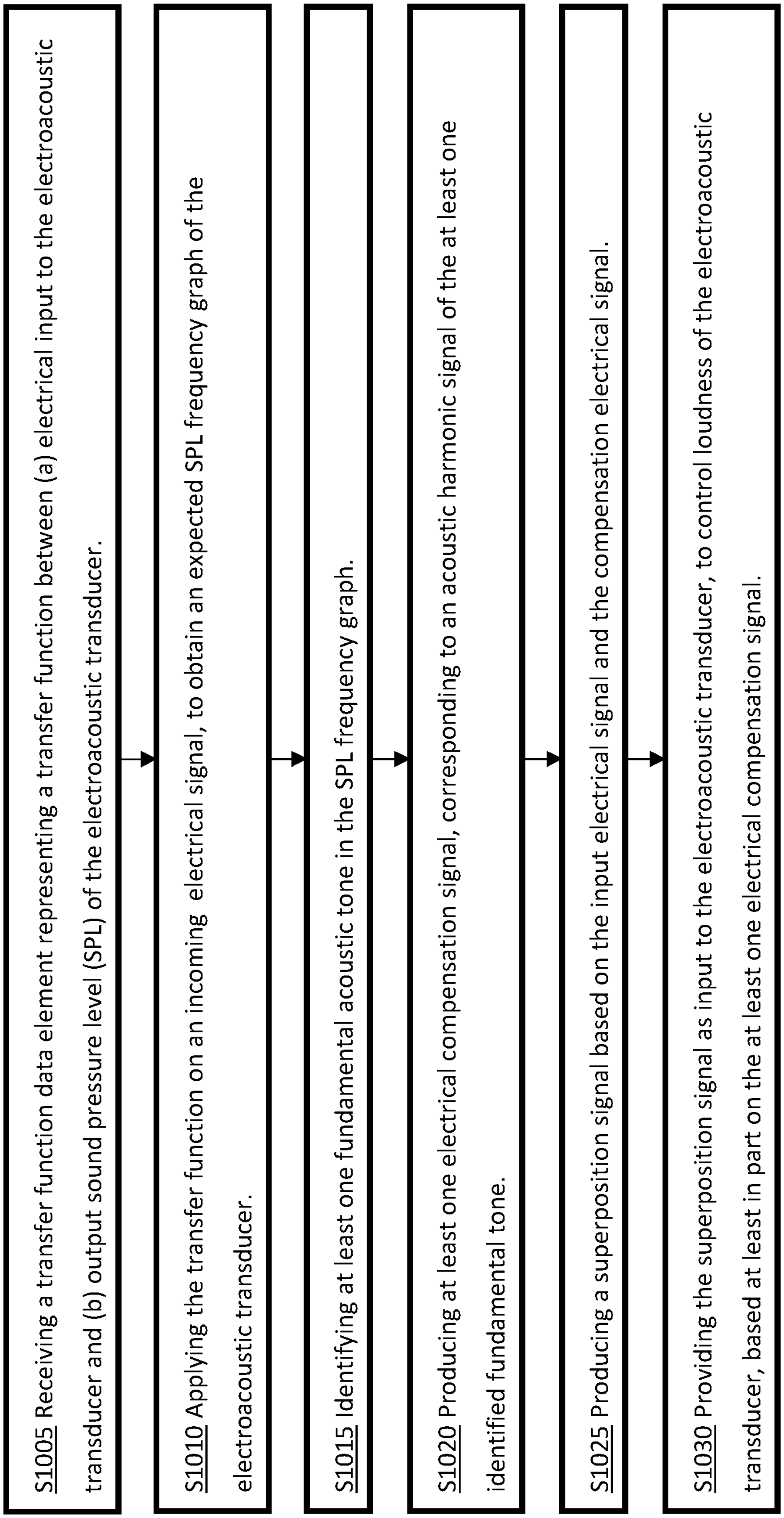
FIG. 5 is a flow diagram depicting a method of controlling loudness of an electroacoustic transducer, according to an embodiment of the present invention.

FIG. 5 is a flow diagram depicting a method of controlling loudness of an electroacoustic transducer (e.g., element 50 of FIG. 2) by at least one processor, such as processor 2 of FIG. 1 (which may be the same as processor 110 of FIG. 2), according to some embodiments of the invention.

As elaborated herein, processor 2 may control, or collaborate with one or more software and/or hardware modules (e.g., analysis module 120, compensation module 130, superposition module 140, dosimeter 160 and/or identifier 150 of system 100 in FIG. 2) to produce a superposition signal 140A of FIG. 2. Superposition signal 140 may then be used as input for an electroacoustic transducer 50, to produce an enhanced audio signal 50A.

As shown in step S1005, the at least one processor 2 (e.g., 110) may receive a transfer function data element (e.g., element 50H of FIG. 2) representing a transfer function (e.g., H(f) of FIGS. 3A, 3B) between (a) electrical input (e.g., element 20 of FIG. 2) to electroacoustic transducer 50, and (b) output sound pressure level (e.g., SPL 50A' of FIG. 3A) of electroacoustic transducer 50.

As shown in step S1010, the at least one processor 2 may collaborate with analysis module 120 to apply the transfer function H(f) on an input electrical signal. Processor 2 may thus obtain an expected SPL frequency graph 120A of FIG. 2 and/or FIG. 3C of electroacoustic transducer 50.

As shown in step S1015, the at least one processor 2 may identify at least one fundamental acoustic tone 122 of FIG. 2 in the expected SPL frequency graph 120A.

As shown in step S1020, the at least one processor 2 may collaborate with one or more band-specific compensation function modules 130, to produce one or more band-specific compensation electrical signal 136A. The one or more band-specific compensation electrical signals 136A, may each correspond to an acoustic harmonic signal of the at least one identified fundamental acoustic tone 122.

For example, (a) for a first fundamental acoustic tone 120B, identified as pertaining to, or included in a first frequency band 121AP, a first band-specific compensation function module 130 may produce a first, band-specific compensation electrical signal 136A; (b) for a second fundamental acoustic tone 122, identified as pertaining to, or included in a second frequency band 121AP, a second band-specific compensation function module 130 may produce a second, band-specific compensation electrical signal 136A; etc.

As shown in step S1025, the at least one processor 2 may collaborate with superposition module 140 to produce a superposition 140 of FIG. 2, based on the input electrical signal 20 and the compensation electrical signal(s) 136A.

As shown in step S1030, the at least one processor 2 may provide the superposition signal 140 as input to electroacoustic transducer 50, and thus control loudness of the electroacoustic transducer in a manner that (a) adheres to safety regulations; (b) takes individual sound dose accumulation into account; (c) provides satisfactory loudness for individual listeners; and (d) avoids noticeable sensation of sound distortion.

The invention claimed is:

1. A method of controlling loudness of an electroacoustic transducer by at least one processor, the method comprising:
   - receiving a transfer function data element representing a transfer function between (a) electrical input and (b) sound pressure level (SPL) output of the electroacoustic transducer;
   - applying the transfer function on an incoming electrical signal, to obtain an expected SPL signal, representing expected SPL of the electroacoustic transducer in response to the incoming electrical signal;
   - segmenting the expected SPL signal into a plurality of band-specific SPL signals, each associated with a respective frequency pass band or frequency gap band;
   - identifying at least one fundamental acoustic tone in the expected SPL signal;
   - producing at least one electrical compensation signal, corresponding to an acoustic harmonic of the at least one identified fundamental acoustic tone;
   - controlling the loudness of the electroacoustic transducer, based at least in part on the at least one electrical compensation signal; and
   - for at least one of the plurality of band-specific SPL signals that are associated with the frequency pass bands:
     - determining one or more acoustic harmonic frequencies of at least one identified fundamental acoustic tone, based on the respective frequency pass band;
     - determining one or more acoustic amplitudes, corresponding to the one or more acoustic harmonic frequencies, based on the respective frequency pass band; and
     - producing at least one respective harmonic SPL signal, representing SPL of the one or more acoustic harmonic frequencies, at the one or more corresponding acoustic amplitudes,
   - wherein identifying at least one fundamental acoustic tone comprises, for at least one of the plurality of band-specific SPL signals that are associated with the frequency pass bands, identifying the at least one fundamental acoustic tone as a prevalent tone represented by the band-specific SPL signal.

2. The method of claim 1, further comprising:
   - producing an electrical superposition signal as a function of the incoming electrical signal and the at least one electrical compensation signal; and
   - providing the superposition signal as input to the electroacoustic transducer, to control loudness of the electroacoustic transducer.

3. The method of claim 2, wherein each electrical compensation signal corresponds to a unique set of the one or more acoustic harmonic frequencies, and wherein the electrical superposition signal is produced as a weighted sum function of the at least one electrical compensation signals and the incoming electrical signal.

4. The method of claim 2, wherein each electrical compensation signal corresponds to a unique group of the at least one harmonic SPL signal, and wherein the electrical superposition signal is produced as a weighted sum function of the at least one electrical compensation signals and the incoming electrical signal.

5. The method of claim 4, further comprising:
   - obtaining a temporal acoustic power value, representing acoustic power that is produced by the electroacoustic transducer in response to input of the superposition signal; and
   - adjusting one or more weights of the weighted sum function, based on the obtained acoustic power value.

6. The method of claim 4, further comprising:
   - integrating the temporal acoustic power value over a predetermined timeframe, to obtain an acoustic dosage value; and
   - adjusting the one or more weights of the weighted sum function, further based on the acoustic dosage value.

7. The method of claim 6, further comprising:
   - receiving one or more identification data elements, representing identification of one or more respective users of the electroacoustic transducer;
   - for at least one identification data element, attributing a respective acoustic dosage value; and
   - adjusting the one or more weights of the weighted sum function, further based on the identification data elements.

8. The method of claim 1, further comprising, for at least one of the plurality of band-specific SPL signals that is associated with a frequency gap band, refraining from producing a respective harmonic SPL signal.

9. The method of claim 1, wherein producing the electrical compensation signal comprises utilizing the transfer function data element to generate a band-specific, electrical compensation signal, based on the respective at least one harmonic SPL signal.

10. The method of claim 1, wherein producing the electrical compensation signal comprises:

obtaining an inverse transfer function data element, representing an inverse version of the transfer function; and applying the inverse transfer function on the at least one harmonic SPL signal, to generate a respective electrical compensation signal, representing (i) the one or more acoustic harmonic frequencies and (ii) the corresponding one or more acoustic amplitudes of the respective harmonic SPL signal.

11. A system for controlling loudness of an electroacoustic transducer, the system comprising: a compensation module, a superposition module, a non-transitory memory device, wherein modules of instruction code are stored, and a processor associated with the memory device, and configured to execute the modules of instruction code, whereupon execution of said modules of instruction code, the processor is configured to:

receive a transfer function data element representing a transfer function between (a) electrical input and (b) sound pressure level (SPL) output of the electroacoustic transducer;

apply the transfer function on an incoming electrical signal, to obtain an expected SPL signal, representing expected SPL of the electroacoustic transducer in response to the incoming electrical signal;

segment the expected SPL signal into a plurality of band-specific SPL signals, each associated with a respective frequency pass band or frequency gap band;

identify at least one fundamental acoustic tone in the expected SPL signal;

produce at least one electrical compensation signal, corresponding to an acoustic harmonic of the at least one identified fundamental acoustic tone;

control the loudness of the electroacoustic transducer, based at least in part on the at least one electrical compensation signal; and for at least one of the plurality of band-specific SPL signals that are associated with frequency pass bands:

determine one or more acoustic harmonic frequencies of at least one identified fundamental acoustic tone, based on the respective frequency pass band;

determine one or more acoustic amplitudes, corresponding to the one or more acoustic harmonic frequencies, based on the respective frequency pass band; and produce at least one respective harmonic SPL signal, representing SPL of the one or more acoustic harmonic frequencies, at the one or more corresponding acoustic amplitudes.

12. The system of claim 11, wherein the at least one processor is further configured to:

produce an electrical superposition signal as a function of the incoming electrical signal and the at least one electrical compensation signal; and provide the superposition signal as input to the electroacoustic transducer, to control loudness of the electroacoustic transducer.

13. The system of claim 11, wherein the at least one processor is further configured to identify the at least one fundamental acoustic tone by identifying, for at least one of the plurality of band-specific SPL signals that are associated with frequency pass bands, the at least one fundamental acoustic tone as a prevalent tone represented by the band-specific SPL signal, within the associated frequency pass band.

14. The system of claim 11 wherein the at least one processor is further configured to, for at least one of the plurality of band-specific SPL signals that is associated with a frequency gap band, refrain from producing a respective harmonic SPL signal.

15. The system of claim 11, wherein the at least one processor is configured to produce the electrical compensation signal by utilizing the transfer function data element, to generate a band-specific, electrical compensation signal, based on at least one harmonic SPL signal.

* * * * *